United States Patent
Blackburn et al.

(10) Patent No.: US 6,703,808 B1
(45) Date of Patent: Mar. 9, 2004

(54) ACTIVE POWER LIMITING FOR STARTER/ALTERNATOR IN THE GENERATION MODE

(75) Inventors: Scott Blackburn, Temperance, MI (US); John Hickey, Toledo, OH (US)

(73) Assignee: Dana Corporation, Ottawa Lake, MI (US)

( * ) Notice: Subject to any disclaimer, the term of this patent is extended or adjusted under 35 U.S.C. 154(b) by 0 days.

(21) Appl. No.: 09/984,788

(22) Filed: Oct. 31, 2001

(51) Int. Cl.[7] ................................................. H02P 7/05
(52) U.S. Cl. ........................................ 318/701; 318/254
(58) Field of Search .................. 318/138, 254, 318/439, 700, 701, 720–724

(56) References Cited

U.S. PATENT DOCUMENTS

| | | | | |
|---|---|---|---|---|
| 5,936,386 A | * | 8/1999 | Heglund | 322/94 |
| 6,011,377 A | * | 1/2000 | Heglund et al. | 318/701 |
| 6,198,256 B1 | * | 3/2001 | Miyasaki et al. | 322/16 |
| 6,396,161 B1 | * | 5/2002 | Crecelius et al. | 290/36 R |

* cited by examiner

Primary Examiner—Bentsu Ro
(74) Attorney, Agent, or Firm—Liniak, Berenato & White

(57) ABSTRACT

A system and method to smoothly limit the top speed of the generator motor at which power is provided. The system according to this invention consists primarily of an engine, which supplies mechanical power to a switched reluctance motor with position sensing capability, which delivers electrical power to an inverter. The inverter contains a digital signal processor (DSP) controller to control the delivery of electrical power to the battery in the generation mode. Signal information regarding motor speed and current is delivered from the switched reluctance motor with position sensing capability to the DSP controller and signal information regarding current and voltage is delivered from the battery to the DSP controller. In the preferred embodiment, the switched reluctance machine will have position sensing capability to monitor the position of the rotor in relation to the stator, and sensors to monitor the phase currents and bus current. A digital signal processor (DSP) will be used in order to meet the precise position-based control requirements. Therefore, since the position and current is monitored and controlled in real-time by the DSP, the power output in the generation mode can be actively reduced as the speed increases or disabled at a certain maximum speed.

9 Claims, 1 Drawing Sheet

| RPM Amount | Generator Power Contribution | Battery Power Contribution |
|---|---|---|
| RPM Range 1 (e.g., up to 11000 rpm) | 100% Generator | 0% Battery |
| RPM Range 2 (e.g., 11000-12000 rpm) | 75% Generator | 25% Battery |
| RPM Range 3 (e.g., ≥12000 rpm) | 0% Generator | 100% Battery |

ACTIVE POWER LIMITING FOR STARTER/ALTERNATOR IN THE GENERATION MODE

BACKGROUND OF THE INVENTION

1. Field of the Invention

The present invention relates generally to electrical generators, and more particularly, the present invention relates to an apparatus and method for limiting the peak speed of the motor at which power is generated.

2. Description of Related Art

An apparatus for control of generator output power is known including an exciting winding of a generator, a voltage regulator connected with the generator, which controls the output power of the generator by influencing the excitation current in the exciting winding of the generator.

An AC alternator, which produces an alternating voltage, is predominantly used in motor vehicles to supply electrical power. The alternating voltage produced by the alternator is rectified in a connected rectifying device for supplying direct-current consuming devices and for charging a battery. Since the output voltage of the generator depends considerably on the generator speed, a voltage regulator is used to provide the desired constant output voltage, which influences the excitation current of the generator, so that the generator voltage is held at a constant value, which in the typical motor vehicle power supply system is 14 volts D.C., despite considerable changes in the generator speed.

Since the number of electrical energy-consuming devices in motor vehicles is continually growing, the requirements for generators are always increasing. Particularly in winter, when window heaters are turned on in addition to the standard consuming devices or when the motor vehicle spends a longer time in city traffic, and also when the generator is operated at a slower rotation speed, energy supply problems develop. For this reason the current generated by the A.C. alternator has been increased, so that the power output of the generator is greater at the same voltage.

A starter/alternator typically requires operation over a relatively wide range of speeds. However, it is undesirable to provide power above a certain speed in the generation mode due to limitations in the microprocessor or position sensor, due to an increase in acoustic noise, and/or due to a decrease in system efficiency.

The need exists for a system and method to actively limit the top speed of the generator motor at which power is provided.

SUMMARY OF THE INVENTION

The present invention provides a system and method to smoothly limit the top speed of the generator motor at which power is provided. Since a starter/alternator is controlled by a microprocessor and the speed of the motor is known at all times, it is possible to actively limit the top speed of the motor at which power is provided in the generation mode.

In accordance with this invention, a system according to this invention is provided which consists primarily of an engine, which supplies mechanical power to a switched reluctance motor with position sensor, which delivers electrical power to an inverter. The inverter contains a digital signal processor (DSP) controller to control the delivery of electrical power to the battery in the generation mode. The system of this invention delivers signal information regarding motor speed and current from the switched reluctance motor with position sensor to the DSP controller and delivers signal information regarding current and voltage from the battery to the DSP controller.

In the preferred embodiment, implementation of the invention will be accomplished with the switched reluctance machine. The machine is attached to the engine in a belt-driven configuration with a pulley ratio (e.g., 2.5:1). The switched reluctance machine will have position sensing capability in order to monitor the position of the rotor in relation to the stator, and sensors to monitor the phase currents and bus current. A digital signal processor (DSP) will be used in order to meet the precise position-based control requirements. Therefore, since the position and current is monitored and controlled in real-time by the DSP, the power output in the generation mode can be actively reduced as the speed increases or disabled at a certain maximum speed.

These and other benefits and advantages associated with the present invention will be apparent to those of skill in the art when viewed in light of the following description and accompanying drawings.

DETAILED DESCRIPTION OF THE PREFERRED EMBODIMENTS

Figures 1, 2:
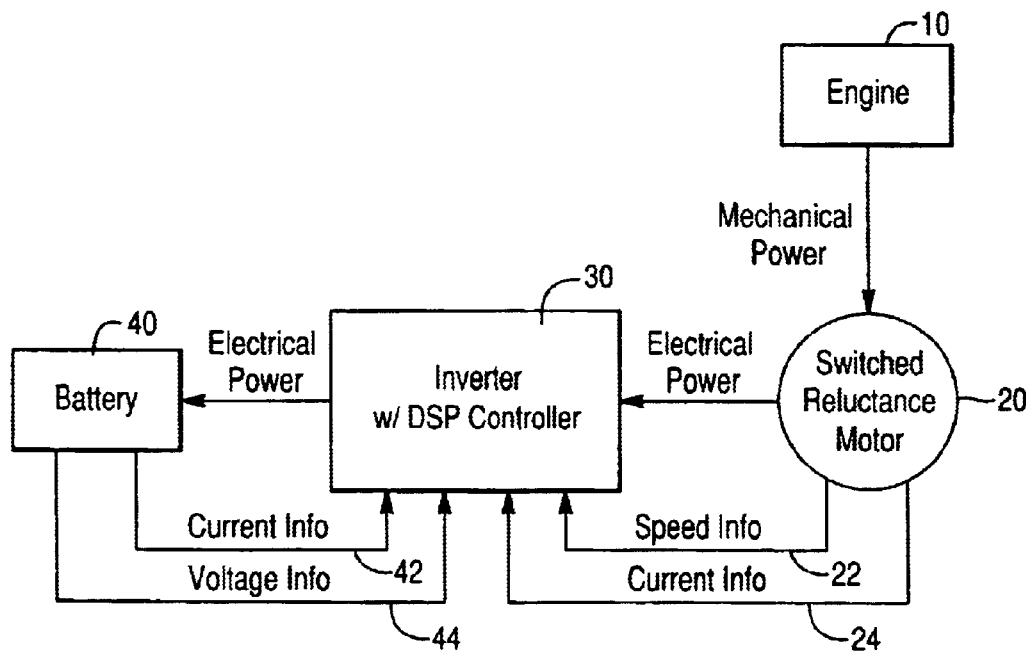
FIG. 1 is a schematic representation showing the power limiting device according to the present invention.
FIG. 2 is a graph showing the relationship of motor speed to power generation according to the instant invention.

With reference to FIG. 1, a system according to this invention consists primarily of a motor/engine 10, which supplies mechanical power to a switched reluctance motor with position sensing capability 20, which in turn delivers electrical power to an inverter 30. The inverter 30 contains a digital signal processor (DSP) controller to control the delivery of electrical power to the battery 40 in the generation mode. The system of this invention delivers signal information regarding motor speed 22 and current 24 from the switched reluctance motor with position sensing capability 20 to the DSP controller 30 and delivers signal information regarding current 42 and voltage 44 from the battery 40 to the DSP controller 30.

Implementation of the invention will be accomplished with the switched reluctance machine 20. The machine 20 will be attached to the engine 10 in a belt-driven configuration (not shown) with, for example, a 2.5:1 pulley ratio. The switched reluctance machine 20 has position sensing capability to monitor the position of the rotor in relation to the stator, and sensors to monitor the phase currents and bus current. A digital signal processor (DSP) will be used in order to meet the precise position-based control requirements associated with this invention. Therefore, since the position and current is monitored and controlled in real-time by the DSP, the power output in the generation mode can be actively reduced as the speed increases or disabled at a certain maximum speed.

As known in the art, a starter/alternator can be connected to an internal combustion engine in several different configurations. In a direct-drive configuration the starter/alternator must operate over the same range of speeds as the engine. However, in a belt-drive configuration the starter/alternator may have to operate over a speed range that is some multiple of the engine speed range, depending on the ratio of the pulley system that is used. In either case, it may be desirable to limit the top speed of the motor drive at which power is provided in the generation mode. In accordance with this invention, the starter/alternator controller can be used to fold back the power output as the desired top speed is approached. Above that desired top speed, the starter/alternator will not provide any power, and the parallel-connected vehicle battery will supply all of the required power for the vehicle systems. This is a reasonable approach since the higher speeds will only occur for short periods of time or during transient events such as transmission gear shifting.

For example, consider a belt-driven starter/alternator that is connected to an engine with a 2:1 pulley arrangement. If the engine speed range in the generation mode is 500 to 7,000 rpm, then the starter/alternator speed range must be 1000 to 14,000 rpm. Assuming that the top speed of the starter/alternator at which power is to be generated is desired to be 12,000 rpm for acoustic noise purposes, at 11,000 rpm the starter/alternator controller will begin to gradually reduce the output power as the speed continues to increase, and at the same time, the battery will gradually begin to supply power for the vehicle loads. See FIG. 2, which shows the relationship of generator vs. battery power contribution at three theoretical stage: up to 11000 rpm, between 11000–12000 rpm, and above 12000 rpm. At 12,000 rpm the output power will have been reduced to a level at which the drive can be de-energized and the battery can supply all of the necessary power for the vehicle loads, without causing any transient events in the vehicle bus voltage. Once the speed drops below 12,000 rpm the drive will be energized once again and the starter/alternator controller will begin to gradually increase the output power as the speed decreases until full power is restored once again at 11,000 rpm. Please note that the speed thresholds provided in this example can be specified at whatever level is necessary for a particular drive in a particular application and are only provided to illustrate the concept of this invention.

While this invention has been shown and described with reference to a particulr system and method, it will be understood by those of skill in the art that various changes in form and detail may be made therein without departing from the spirit and scope of the instant invention.

What is claimed is:

1. A power system, comprising:

an engine adapted to supply mechanical power;

a switched reluctance motor with position sensing capability which receives said mechanical power from said engine and generates electrical power from said mechanical power;

an inverter electrically connected to said switched reluctance motor, said inverter adapted to receive said electrical power; and a battery connected in parallel to said inverter to an electrical load connected to said power system;

a digital signal processor for controlling delivery of said electrical power to said electrical load and battery in generation mode, wherein power output in said generation mode of said switched reluctance motor can be actively reduced as a speed of said switched reluctance motor increases, said battery replacing said reduced electrical output of said switched reluctance motor so as to maintain power system output to said electrical load relatively constant.

2. The power system of claim 1, wherein said power output in the generation mode is totally disabled at a predetermined maximum speed and electrical power is supplied to said electrical load entirely from said battery.

3. The power system of claim 1, further comprising first signal delivery means for delivering signal information regarding motor speed and current from the switched reluctance motor with position sensing capability to the digital signal processor.

4. The power system of claim 1, further comprising second signal delivery means for delivering signal information regarding current and voltage from the battery to the digital signal processor.

5. The power system of claim 1, wherein said switched reluctance motor is attached to the engine in a belt-driven configuration with a predetermined pulley ratio.

6. The power system of claim 1, wherein said switched reluctance motor has position sensing capability to monitor a position of a rotor in relation to a stator.

7. The power system of claim 1, further comprising sensors to monitor a phase current and a bus current.

8. The power system of claim 1, wherein said digital signal processor is used in order to provide precise position-based control requirements for limiting said power output.

9. The power limiting system of claim 1, wherein the power output of said switched reluctance motor is proportionately disabled at a predetermined speed since position and current is monitored and controlled in real-time by the digital signal processor and said battery supplies an inverse of said proportionately disabled power output so as to maintain system output to said electrical load relatively constant.

* * * * *